United States Patent [19]

Downs et al.

[11] 4,263,021
[45] Apr. 21, 1981

[54] GAS-LIQUID CONTACT SYSTEM

[75] Inventors: William Downs, Alliance; Edward A. Pirsh, Akron; Jack F. Stewart; Stephen S. Strom, both of Alliance, all of Ohio

[73] Assignee: The Babcock & Wilcox Company, New Orleans, La.

[21] Appl. No.: 627,426

[22] Filed: Oct. 30, 1975

Related U.S. Application Data

[63] Continuation of Ser. No. 312,424, Dec. 5, 1972, abandoned.

[51] Int. Cl.³ ............................................. B01D 47/02
[52] U.S. Cl. .......................................... 55/73; 55/93; 55/242; 55/248; 55/344; 261/18 B; 261/113; 423/242

[58] Field of Search ................ 55/223, 224, 228, 240, 55/244, 248, 257 R, 257 PV, 257 OV, 257 C, 257 IP, 257 PP, 257 HE, 258, 259, 302, 318, 341, 342, 233, 226, 392, 410, 413, 417, 421, 73, 84, 465, 93, 242, 344; 261/18 B, 113, 117, DIG. 9; 23/284; 423/242

[56] References Cited

U.S. PATENT DOCUMENTS

| | | | |
|---|---|---|---|
| 3,489,506 | 1/1970 | Galstaun et al. | 261/114 K |
| 3,615,199 | 10/1971 | Terrana | 55/233 |
| 3,834,129 | 9/1974 | Darlinger et al. | 55/242 |

FOREIGN PATENT DOCUMENTS 303978  7/1971  U.S.S.R. .................................. 261/113

*Primary Examiner*—David L. Lacey
*Attorney, Agent, or Firm*—Robert J. Edwards; Vincent M. Fazzari; Edward A. Steen

[57] ABSTRACT

A gas-liquid contact system for absorption of gaseous contaminants in an absorptive liquid where contact is attained by controlled flow relation between the gas and liquid forming a fluidized liquid mass for intimate contact between gas and liquid.

6 Claims, 3 Drawing Figures

GAS-LIQUID CONTACT SYSTEM

This is a continuation of application Ser. No. 312,424, filed Dec. 5, 1972, now abandoned.

The present invention relates to a method of and apparatus for obtaining counter-current gas-liquid contact, and more particularly to gas-liquid contact between flue gas containing $SO_2$ and a slurry or solution containing reactive materials as a chemical reacting absorbing medium.

Gas and liquid contact systems are well known and take many forms, where each system is particularly useful in a particular situation depended upon the objective of the system. Some systems are particularly useful for heat exchange purposes, or for the removal of entrained solids and/or liquids in a gas, while other systems are particularly useful for chemical interchange between the gas and liquid. All systems will have some effect on all uses, as for example a system intended to attain chemical interaction between gas and liquid such as by absorption of one or more constituents in the gas by the liquid will also have some heat exchange effect if any temperature differences exist between the liquid and the gas. In a similar manner any entrained solids in the gas will tend to be removed by the gas and liquid contact. However, under such conditions the chemical interaction will be predominant and the other effects will be more or less incidental. Usually in chemical interaction between gas and liquid it is desirable to provide not only intimate contact, but sufficient time of contact to effect chemical reaction.

In the present invention, a gas is passed upwardly at velocities of 5-20 feet per second through an upright tower in counter-current contact with liquid which is introduced near the top and discharged from the bottom of the tower. Intermediate the height of the tower is positioned a plurality of vertically spaced horizontally disposed perforated plates. Each plate is provided with a plurality of upright partitions attached to the plate and arranged to subdivide the upper plate surface into a plurality of generally equal area open topped compartments. With a proper coordination of liquid and gas flow rates, plate perforation arrangement and spacing dimensions, the gas and liquid will form gasified liquid masses in the compartments leading to stabilized liquid holdup encouraging both intimate contact and sufficient contact time for adequate chemical interchange between the media for absorption purposes. The correlation between flows and dimensions depends on numerous factors, such as the chemical interaction desired, the nature of both the liquid and the gas, as well as the quantities of materials involved.

Figure 1:
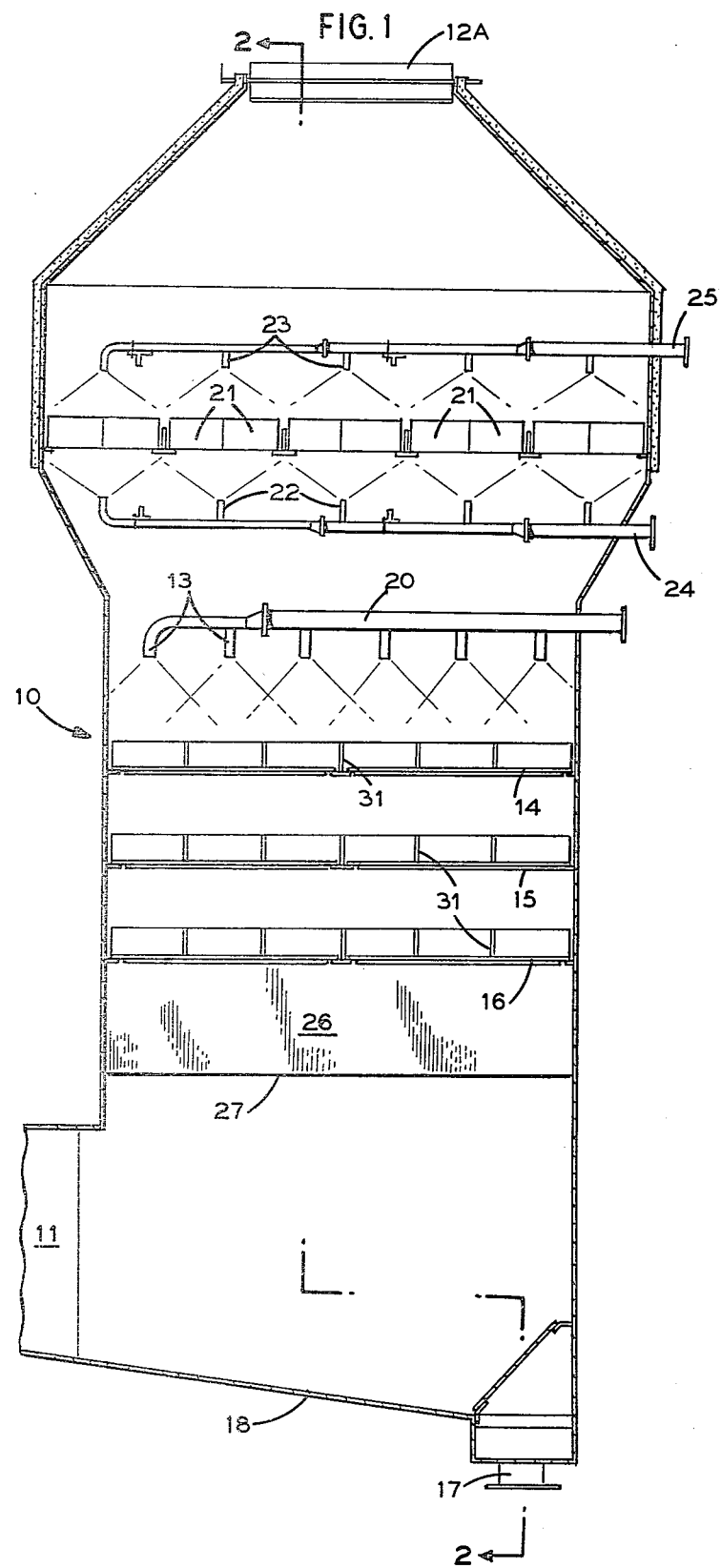
FIG. 1 is a side elevation, in section, of an absorption tower constructed and arranged in accordance with the invention.
Figure 2:
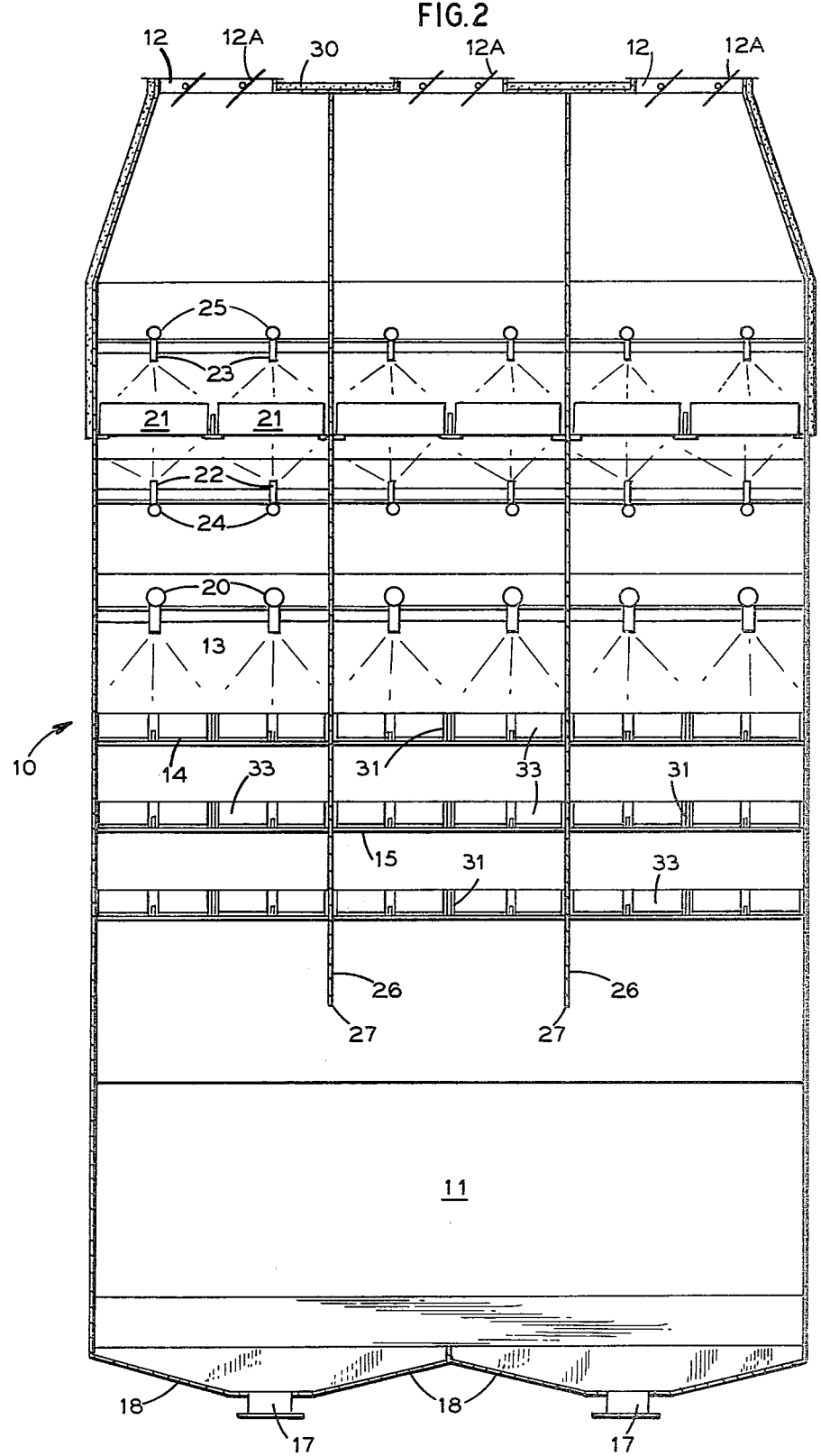
FIG. 2 is an elevation, in section, taken along the line 2—2 of FIG. 1.

In the illustrated embodiment of the invention, gases from an external source enter the lower portion of a contact tower 10 through an inlet duct 11, and pass upwardly to discharge through outlets 12 formed in the top of the tower. The outlets 12 are each provided with a cut-off valve 12A for gas flow control therethrough. In passing through the tower 10 the gases are in counter-current contact with a liquid which is introduced by downwardly directed spray nozzles 13 positioned intermediate the height of the tower and above the uppermost of a plurality of vertically spaced perforated trays or plates 14, 15 and 16. The liquid gravitates downwardly through the successive perforated plates to discharge through liquid outlets 17 in the bottom 18 of the tower 10.

With gas and liquid contact occurring in the zones on and above the perforated plates 14, 15 and 16, the gas ascending through the liquid spray from the nozzles 13 will entrain liquid in small droplet form. Some of the larger droplets may be separated in the tower above the manifolds 20 supplying the nozzles; but in any event all of the gases pass through droplet removal devices 21, such as known nested cheveron demisters, to avoid liquid discharge through outlets 12 to the atmosphere. As shown the droplet removal devices are washed to remove deposits which may accumulate on the surfaces of the devices 21. Such washing is attained by water sprays directed against both gas inlet and gas outlet surfaces of the devices 21 from nozzles 22 and 23 supplied by the manifolds 24 and 25, respectively. The water supply to manifolds 24 and 25 may be continuous or intermittent, as required in any set of operating circumstances.

The spray liquid used for absorption may contain reactive solids in suspension to form a slurry, the chemical reacting absorption medium may be a liquid solution, or the chemical reacting absorption medium may be a mixture of solids in suspension and a liquid solution. Ordinarily, the liquid will be water, but other liquids may be used. For convenience, the chemical reacting absorption medium is referred to as a liquid where the term includes a slurry.

In the embodiment illustrated, the tower 10 is of rectangular horizontal cross-section with a cross-sectional dimension of approximately 20 feet by 30 feet. As shown, two upright baffles 26 extend from a lower postion 27 upwardly adjacent the upper level of the gas inlet duct 11 to the top plate 30 of the tower. The baffles divide the tower into three substantially equal parallel gas flow paths, each having a centrally positioned gas outlet 12. With such an arrangement it is possible to close one of the gas outlets 12 and to force the gas through the remaining outlets without shutting down the tower or adversely affecting the absorption ability of the gas-liquid contact device. Such operation may be desirable to clean the devices 21, when necessary. It will be understood greater or lesser numbers of baffles 26 may be installed in any particular installation.

As shown in the drawings, each of the perforated plates 14, 15 or 16 are divided into compartments by upright partitions 31 which are typically 12 to 24 inches in height. The partitions are horizontally spaced to provide compartments 33 of from 15 to 20 square feet in horizontal area. As shown particularly in FIG. 3, suitable structural support members 32, such as I beams and channels, are provided to establish and maintain the plates 14, 15 and 16 in a substantially horizontal position. The support members 32 are attached to the walls of the tower 10 with the plates 14, 15 and 16 extending transversely across the tower as small or large elements forming a perforated barrier to gas flow upwardly and liquid flow downwardly through the tower.

Figure 3:
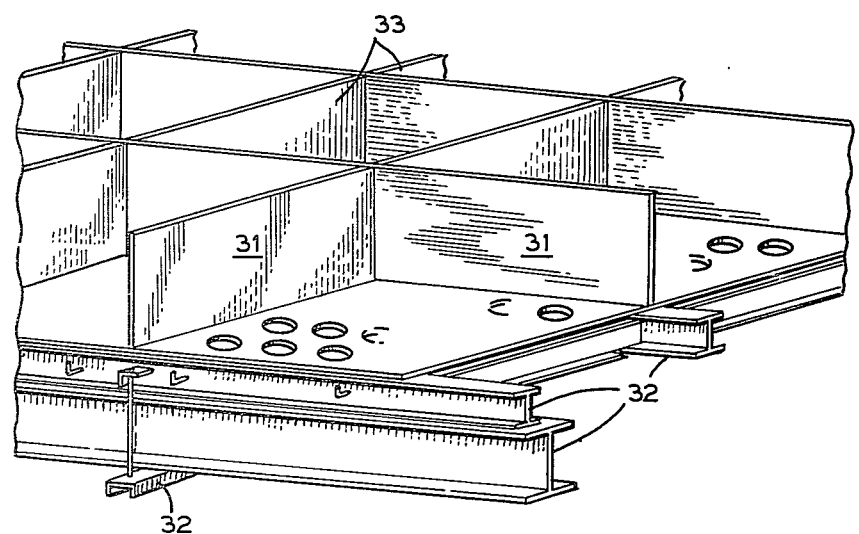
FIG. 3 is an enlarged perspective of a portion of the apparatus shown in FIGS. 1 and 2.

As shown in the drawings and with particular reference to FIG. 3, the perforated plates 14, 15 and 16 are each formed with relatively large openings, preferably in a symetrical arrangement, representing a total opening through each plate of 25 to 50%. In the embodiment shown, utilizing particular materials and flow rates hereinafter described, the plates are each provided with 1⅜ inch holes on 2¼ inch center spacing for a 30% open area.

In the specific example so far described, the tower 10 was utilized for the removal of gaseous sulphur dioxide from flue gases produced from the combustion of a sulphur containing fossil fuel. The flue gases entering the tower 10 through the inlet duct 11 were substantially at saturation temperature of approximately 140° F. and were substantially free from entrained solid matter. The liquid or reactive absorbent utilized was a slurry with 5 to 10% solids in suspension in water, containing reactive calcium carbonate with generally non-reactive calcium sulfite and calcium sulphate introduced through the manifold 20. The non-reactive solids of the slurry were present due to recirculation of at least some of the slurry discharged from the liquid outlets 17 to the manifold 20.

The gas flow to the tower was a maximum of 400,000 CFM, and the liquid or slurry was delivered to the manifolds 20 and through the nozzles 13 at a total rate of approximately 12,000 gallons per minute. Under these conditions, the gas velocity approaching the lower perforated plate 16 was 10 to 12 feet per second and approximately 20 gallons of liquid per square foot of perforated plate area per minute was delivered to the absorption zones within the tower 10. With the use of compartments 33 on the upper surface of each perforated plate, the distribution of liquid slurry was generally uniform throughout the cross-section of the tower 10.

In operation it was observed that one or several of the 1⅜ inch holes in each compartment 33 apparently passed most of the slurry downwardly through the plate while the remaining holes passed the gas upwardly into each compartment. However, the slurry discharge position will vary in its location laterally in a random frequency which tends to maintain the openings in a clear and operative condition over an extended period of time. In other words, the arrangement is self-cleaning to a high degree during operation. The mixture of slurry and gas in contact within the compartments 33 will form a fluidized mass of liquids and gas which will have an apparent upper surface of perhaps double or triple the expected upper surface of the slurry alone. The apparent upper level of the fluidized mass will be 8 to 10 inches above the upper surface of the associated plate 14, 15 or 16 under the flow conditions described.

It has been found that the apparatus described and under the liquid flow conditions specified in the example will also effectively function without any appreciable loss of absorptive efficiency at gas flow rates as low as 25% of that specified while maintaining the high slurry flow rates.

What is claimed is:

1. A gas-liquid contact device comprising walls defining an upright housing with a gas inlet and having means for passing gas upwardly therethrough one or more horizontally disposed perforated plates extending across the housing, the one or more perforated plates being vertically spaced in the housing in location upward from the gas inlet, each of the one or more perforated plates being perforated with substantially symmetrically spaced relatively large openings to form an open area through each of the one or more plates equivalent to approximately 25-50% of the cross sectional area of the housing, a plurality of upright partitions mounted on each of the one or more perforated plates, at least one of the partitions on each of the one or more perforated plates being mounted substantially perpendicular to the other partitions on the one or more perforated plates to form a plurality of open-topped compartments, the height of the partitions being substantially equal and terminating intermediate the spacing above each of the one or more perforated plates, nozzle means positioned interior to the housing above the uppermost of the one or more perforated plates and symmetrically arranged with respect to the one or more perforated plates so as to deposit substantially equal quantities of liquid slurry or liquid solution in the compartments of the uppermost of the one or more perforated plates and at least one or more gas outlet means positioned above the nozzle means for discharge of said gas from the housing.

2. A gas-liquid contact device according to claim 1 wherein means divide the upright housing into a plurality of parallel gas paths in vertical linear relationship from the gas inlet to the one or more gas outlet means.

3. A gas-liquid contact device according to claim 2 wherein valve means in each of the one or more gas outlet means control gas flow therefrom.

4. A gas-liquid contact device according to claim 1 wherein scrubber means is spaced above the nozzle means for removal of entrained droplets from the gas prior to discharge from the housing.

5. A gas-liquid contact device according to claim 4 wherein washing means including water spray nozzles are arranged to inject water to impinge on said scrubber means.

6. In a counter-current liquid gas contact device having one or more vertically spaced perforated plates extending horizontally across the flow path of an upwardly rising stream of $SO_2$ containing gas, each of the one or more perforated plates having approximately 25-50% open area and being divided into a plurality of open topped compartments, the method of operation which comprises passing the gas upwardly to the plates at a rate of 5 to 20 feet per second, introducing a spray of chemically reactive liquid slurry or liquid solution with about 5-10% suspension containing calcium compounds to the uppermost of said one or more plates for downward movement therethrough in counter-current contact with the gas, the chemically reactive liquid slurry or solution being introduced at a rate of approximately 20 gallons per square foot of plate area per minute.

* * * * *